Jan. 3, 1950     O. J. BLANCHET     2,493,612
MOTION-PICTURE APPARATUS
Filed Jan. 15, 1948
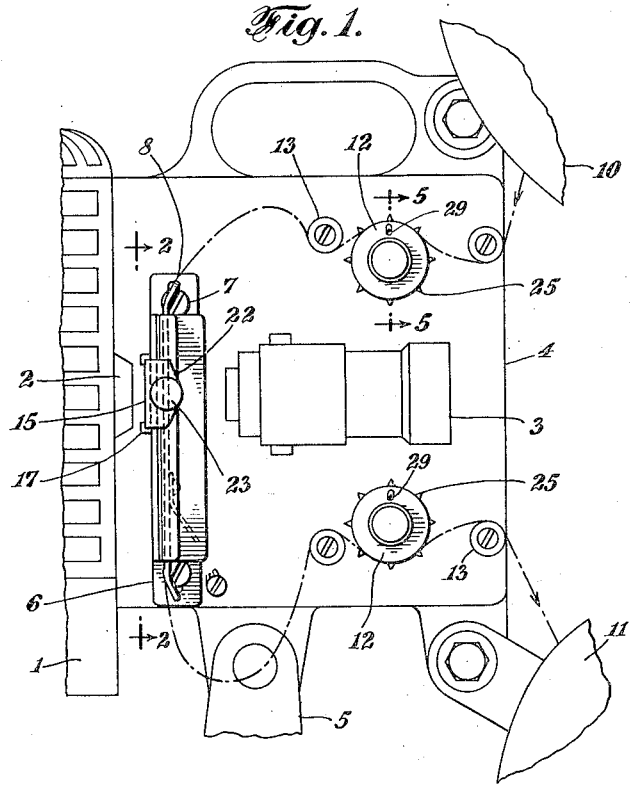
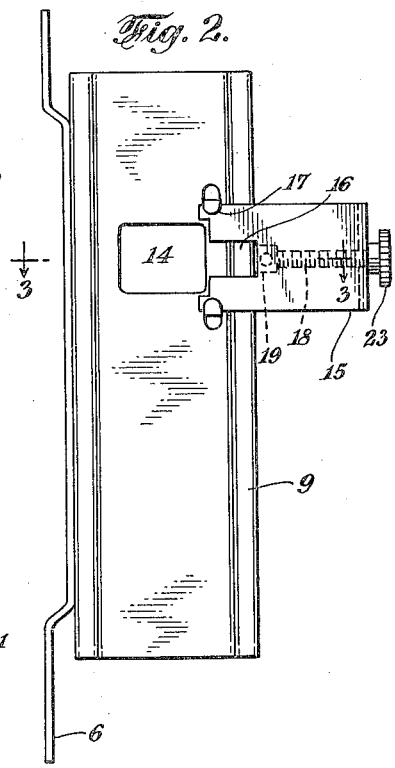
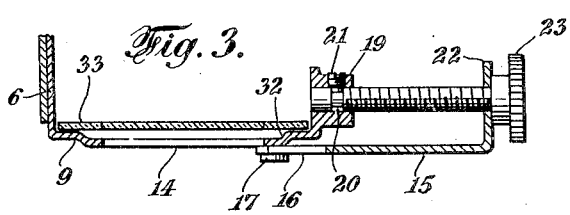
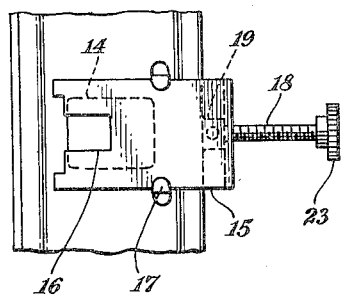
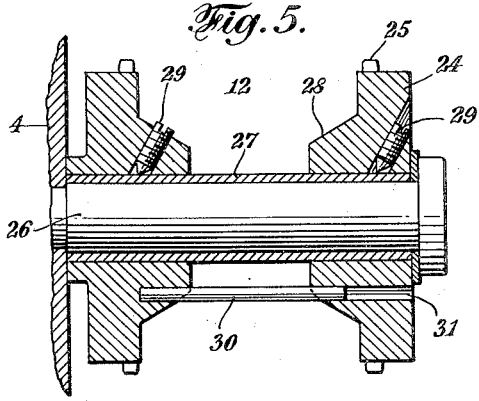
INVENTOR.
*Ovila J. Blanchet.*
BY *William F. Nickel*
ATTORNEY.

Patented Jan. 3, 1950

2,493,612

UNITED STATES PATENT OFFICE 2,493,612

MOTION-PICTURE APPARATUS

Ovila J. Blanchet, New Bedford, Mass.

Application January 15, 1948, Serial No. 2,540

1 Claim. (Cl. 88—17)

This invention is an improvement in mechanism for actuating strips of photographic film, particularly motion picture projectors and other apparatus employed in the same field.

An important object of my invention is to provide motion picture apparatus capable of use with strips of different width by means of parts or members which can be readily incorporated into motion picture units of conventional design, and which therefore need not be specially constructed for the purpose. In its preformed form the apparatus has parts which can easily be adjusted by an unskilled person, utilizing an ordinary tool at most, to adapt the machine at any time to be run with a relatively wide film or a relatively narrow one.

A further object of the invention is to provide adjusting members, simple in structure and mode of operation, and adapted to be conveniently and quickly mounted in their proper positions.

The foregoing and other objects and advantages are clearly set forth in the ensuing description which, taken in connection with the accompanying drawings, also makes plain the preferred construction in which the improvement is embodied. But this disclosure is explanatory only and deals with only one embodiment of the invention; while in actual practice other forms may be given thereto and various alterations adopted in details of structure, without essentially changing the general plan which distinguishes the invention.

On the drawings,

Figure 1 is a side view of part of a motion picture projecting mechanism having my invention attached.

Figure 2 is a front view of the film gate member with the gate opening.

Figure 3 is a top view of said member, in section.

Figure 4 is a view of part of the film gate member with the opening, on an enlarged scale; and Figure 5 shows in section the construction of the sprockets by which the film is kept in motion.

On the drawings, the housing for the lamp is shown in part at 1, the usual aperture with one or more lenses for the passage of the beam of light from the housing being indicated at 2. The usual lens projector is illustrated at 3, mounted upon a framework or other support 4, adjustably secured to a base or pedestal 5. The framework also carries a bracket 6, held in place on the framework by screws 7. These screws engage slotted openings 8 in the ends of the member 6, and affixed to the latter is the film gate member 9. The strip of film bearing the pictures to be reproduced is drawn from a reel 10 and wound up on another reel 11, these reels being suitably mounted on the framework 4. The film is moved by one or more sprocket members 12 and is further engaged by idle rolls 13 for correct guidance. In this manner the strip is moved at the predetermined speed past the gate opening 14 in the member 9. These parts are found in virtually all types of motion picture projectors, though some have a single sprocket instead of two.

The chief aim of this invention is to enable a motion picture machine to be instantly converted from a device for use with a wide film to a device for use with a narrow film and vice versa, without need for changing the main design of the apparatus or any substantial rearrangement of its various parts. To this end I attach to the member 9 means for controlling the size of the gate opening 14 therein, and I have originated a novel form of sprocket by which either a narrow or a wide film can be engaged and actuated. For popular use, all strips of film now produced have a width of either 8 millimeters or 16 millimeters; and my invention is designed to operate with either of these and to give perfect results with both.

Accordingly I add to the film gate member a movable element 15 having an approximately square recess 16 in one end. This element has the form of a plate, with its opposite edges slidably engaged by clips or guides 17 affixed to the face of the member 9. The other end of the element 15 is engaged by a screw 18 that is rotatably secured in a hollow boss or projection 19 on the side of the member 9. This screw has a circumferential groove 20 into which fits the end of a screw or plug 21 in the boss 19. Thus the screw 18 can turn, but cannot move lengthwise. It passes through a threaded aperture in a flange 22 on the element 15, and bears a knob 23. The plate 15 is in line with the gate opening 14, and the transverse central axes of this opening and the recess 16 coincide. Hence, when the screw is turned, the plate is moved to be retracted and thus expose the opening 14 fully for a 16 millimeter film, or advanced to the position shown in Figure 4 to mask all of this opening except a portion having the same area as the recess 16, for an 8 millimeter film.

The sprocket of my invention employed in conjunction with the adjusting element for the gate opening is illustrated fully on Figure 5. It comprises two disks 24 with teeth 25 to enter the two rows of perforations along the edges of the film to urge the film forward. These disks are mounted on a shaft 26. They are each affixed to a tubular hub 27, but can be caused to assume and retain positions at a greater or less distance apart. The disks have bosses 28 each of which bears a screw 29. These screws hold the disks in place on the hub 27, and when loosened, permit the disks to be moved closer together or farther apart, according to whether a narrow film or a wide film is to be utilized. One disk has a rod 30 fixed thereto, and the other has a bore 31 in which the rod 30 is received. Thus, when the disks are adjusted the teeth 25 on the two disks remain in transverse alinement.

When a reel with a wide film is disposed in the machine, the large gate opening 14 is employed and the sprockets will be so adjusted that the disks 24 will be the maximum distance apart, as shown in Figure 5. To adjust for a smaller strip, for example, an 8 millimeter film strip, the element 15 is moved by means of the screw 18 to give a small gate opening by making the recess 16 in the element 15 serve the purpose. This recess has the area which the size of the photographic images on the narrower film require.

The member 9 has the shape of a shallow channel with inside shoulders 32, as depicted in Figure 3. A wide 16 millimeter strip of film extends approximately all the way from one of these shoulders to the other, and runs between the gate member and a presser element 33. When an 8 millimeter strip is utilized, it can be operated so that it runs between the member 9 and the element 33 as before, but it will not extend from one side of the channel in the member 9 to the other. Instead it can be disposed so that one edge will run between the element 33 and the shoulder 32, for example, that is closer to the bracket 6. Hence the plate 15 will be so moved that the smaller gate opening will be made by the adjacent edge of the opening 14 and the recess 16. Also the heads 24 of each sprocket 12, whether one or two are included, will be correspondingly set on their hubs 26 so as to bring the middle of the distance between the two disks 24 nicely into line with the middle of the smaller opening in the gate member 9. The reproduction of the film will then be quite satisfactory.

My invention is adapted for both motion picture projectors to reproduce pictures and for motion picture cameras by which the films are first exposed and the pictures taken, as it will work with equal efficiency with both kinds of apparatus. The improvement is quite simple, inexpensive to make, can be installed on any motion picture unit, and is well calculated to serve all the purposes for which it is intended.

Having described my invention, what I believe to be new is:

Motion picture apparatus comprising a film gate member having an opening, a plate adjacent one face of said member and movable transversely thereof, said plate having a recess in one end to cooperate with said opening to reduce the area of the latter, said member having guide clips thereon engaging the edges of said plate, said plate having at its opposite end a bent over flange with a threaded opening, said member having a projection at one edge, the flange and projection extending towards the opposite face of said member, an adjusting screw engaging said opening, said hollow projection having an opening receiving the end of said screw, a retaining screw in said projection, said first-named screw having a groove engaged by the retaining screw to secure the first-named screw in said opening and permit rotation thereof to adjust said plate, and sprocket wheels with teeth to engage a strip of film to pass said opening, a tubular hub bearing said wheels, a fixed journal carrying said hub adjacent said film gate member, screws in said wheels for holding said wheels in adjusted positions on said hub, according to the size of said opening as determined by said plate, and a rod affixed at one end to one of said bosses, the other boss having a bore slidably receiving and enveloping the other end of said rod, to cause said wheels to rotate as a unit.

OVILA J. BLANCHET.

REFERENCES CITED

The following references are of record in the file of this patent:

UNITED STATES PATENTS

| Number | Name | Date |
|---|---|---|
| 1,893,189 | Watts et al. | Jan. 3, 1933 |
| 1,955,938 | Berkowitz | Apr. 24, 1934 |
| 1,972,555 | Fear | Sept. 4, 1934 |

FOREIGN PATENTS

| Number | Country | Date |
|---|---|---|
| 469,943 | France | June 4, 1914 |
| 105,812 | Australia | Nov. 11, 1938 |